Patented June 1, 1926.

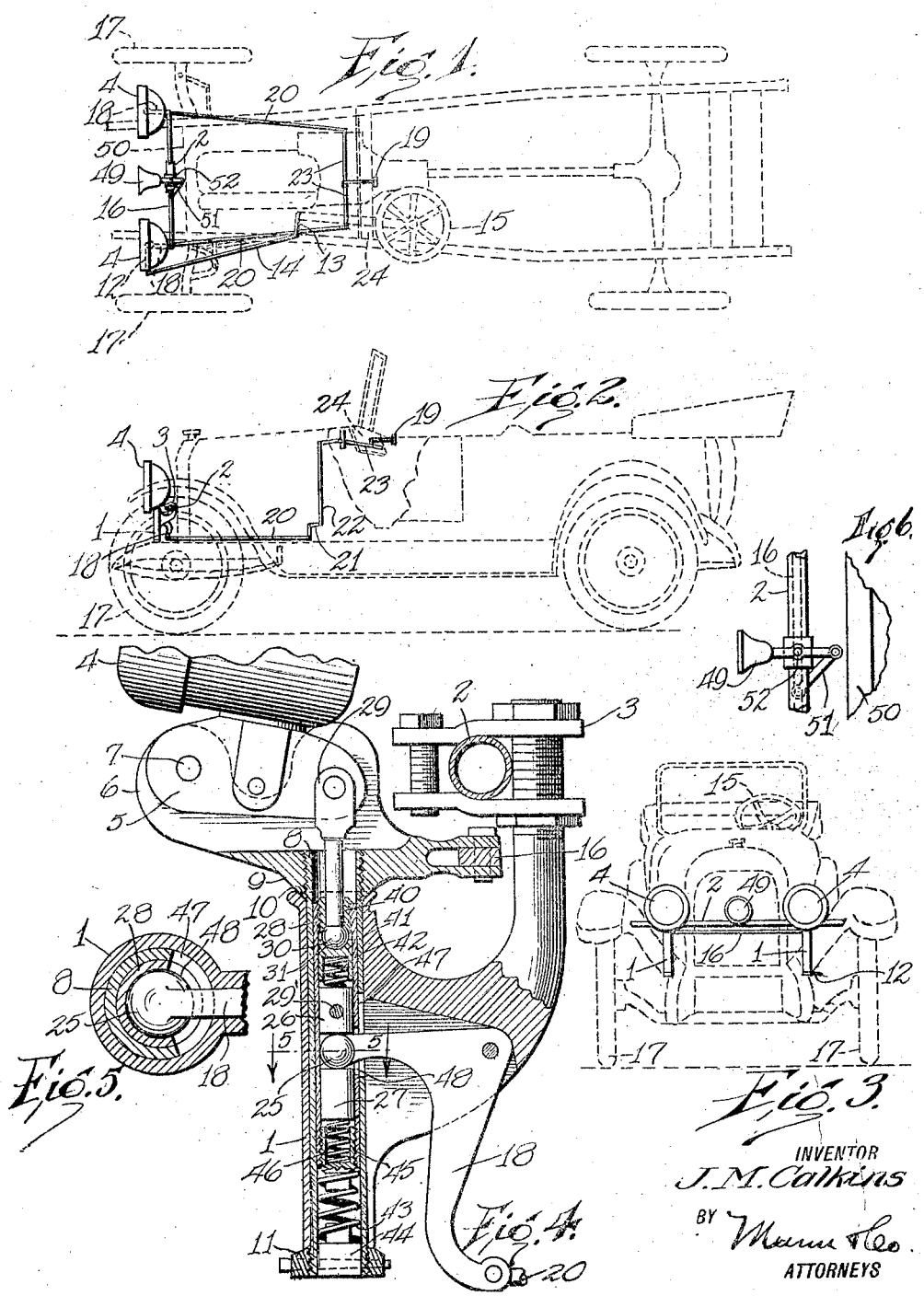

UNITED STATES PATENT OFFICE.

JAMES M. CALKINS, OF CHICAGO, ILLINOIS, ASSIGNOR TO SCOTT HEAD LAMP CONTROL, OF MIAMI, FLORIDA, A CORPORATION OF FLORIDA.

DIRIGIBLE HEADLIGHT FOR VEHICLES.

Application filed May 5, 1923. Serial No. 636,944.

My invention relates to improvements in dirigible headlights for vehicles, and it consists in the combinations, constructions, and arrangements herein described and claimed.

An object of my invention is to provide a dirigible headlight for vehicles which is adapted to automatically turn the headlights in the same direction as the wheels of the automobile, when the latter are turned, and which is also adapted to be swung in a vertical plane, this latter movement being accomplished at the will of the operator.

A further object of my invention is to provide a device of the type described which has novel means for resiliently supporting the headlight, whereby the vibration of the headlight is reduced to a minimum.

A further object of my invention is to provide a device of the type described which combines the means for rotating the headlight in a horizontal plane, and the means for swinging the headlight in a vertical plane in a single supporting standard.

A further object of my invention is to provide a device of the type described which may be readily attached to cars of standard construction, with but slight alterations being necessary in the latter.

A further object of my invention is to provide an audible signal such as a horn which will be moved in conformity with the front wheels and the headlights, so as to project a maximum sound in the direction in which the vehicle is turning.

Other objects and advantages will appear in the following specification, and the novel features of the invention will be particularly pointed out in the appended claims.

My invention is illustrated in the accompanying drawings forming part of this application, in which—

Figure 1 is a plan view of a car showing the device operatively applied thereto, Figure 2 is a side elevation of the car showing the device operatively applied thereto, Figure 3 is a side elevation of the car further illustrating the manner in which the device is secured to the car, Figure 4 is a vertical section through the device, portions thereof being shown in elevation, Figure 5 is a section along the line 5—5 of Figure 4, and Figure 6 is a detail view of the means for attaching the horn to the car.

In carrying out my invention I make use of an automobile such as shown diagrammatically in Figures 1, 2, and 3 of the drawings. Figures 1, 2, and 3 further show how the device is attached to the automobile. The device comprises two supporting standards 1, one of the standards being shown in Figure 4 of the drawings. Both of the standards 1 are secured to a cross bar 2 that is provided in most of the standard types of cars. Clamping means 3 holds the standard 1 in adjusted position, and prevents the standard from swinging about the pipe 2. The lamps 4 of the car are carried by the standard 1, and are pivotally connected thereto.

Means for connecting the lamps 4 to the standards 1 is clearly shown in Figure 4 and comprises a lamp carrying support 5, which is pivotally secured to a casting 6 at 7. The casting is secured to the upper end of a tubular member 8 that is rotatably mounted in the support 1. The casting 6 has a conical-shaped under surface 9 that is rotatably carried by a conical-shaped recess 10 in the upper portion of the support 1. The tube 8 is prevented from vertical movement by a collar 11 which is secured to the lower end of the tube which contacts with the lower end of the support 1. It will be seen from this construction that rotation of the collar 11 will swing the light 4 in a horizontal plane. Means for swinging the light 4 is diagrammatically shown in Figures 1 to 3 inclusive.

The collar 11 has an arm 12 which is operatively connected to an arm 13 by means of a link 14, (see Figure 1). The arm 13 is swung when the steering wheel 15 is turned. The two lights 4 of the car are connected to each other by means of a link 16 that is pivotally secured to the casting 6 of each standard 1. The swinging of the steering wheel 15 will therefore swing the lamps 4 so that the lamps are turned in the same direction in which the front wheels 17 are turned.

Both standards 1 are provided with means for swinging the lamps in a vertical plane. The frame 5 is adapted to be swung in a vertical plane by means of a lever 18. The levers in turn are operatively connected to an actuating handle 19 by means of a link 20, a bell crank lever 21, a link 22, and a crank 23, (see Figure 2). The handle 19 or actuating rod, is rotatably carried by the dashboard 24 of the car. It will be noted that the rod is threaded, whereby rotation of the rod will move the rod along its longitudinal axis. The inner end of the rod is operatively connected to the crank 23, and is adapted to rock the crank when the rod is actuated. The rocking of the crank causes the headlights to swing in a vertical plane.

The connection between the lever 18 and the frame 5 is especially designed so as to provide a resilient support to the lamp 4. It will be noted from Figure 4 that the free end of the lever 18 is spherical-shaped, as at 25, and is disposed between two cylindrical members 26 and 27. The members 26 and 27 are disposed in a tube 28 which in turn is slidably mounted in the tube 8. The member 26 is rigidly secured to the tube 28 by means of a rivet 29', whereby a movement of the spherical portion 25 in an upward direction will cause the tube 28 to move upwardly in the tube 8. The frame 5 is yieldingly connected to the tube 28 by means of a rod 29 that has its lower spherical end 30 disposed in a socket 31. The socket 31 is formed by a cylindrical member 40 which is threaded into the top of the tube 28 and by a cylindrical member 41 that is slidably mounted in the tube. A spring 42 is disposed between the member 26 and the member 41 and yieldingly holds the member 41 in engagement with the spherical end 30. This construction permits the rod 29 to move downwardly a slight distance with respect to the tube 28. The spring 42 in other words, acts as a shock absorber for the frame 5.

A second shock absorber consists of a spring 43 which is disposed between a plug 44 and a screw plug 45, that is threaded into the lower end of the tube 28. The spring 43 yieldingly supports the tube 28. The cylindrical member 27 is supported by the screw plug 45 in much the same manner as the member 41 is supported by the member 26. It will be noted from Figure 4 that a spring 46 is disposed between the screw plug 45 and the member 27, and bears against the under side of the member 27. The spring 46 is disposed in the screw plug 45.

From the foregoing description of the various parts of the device, the operation thereof may be readily understood. The device may be readily attached to a car of standard construction, with but slight alterations being necessary in the latter. The lamps instead of being carried by the rod 2 are supported by the standard 1 in the manner heretofore described, the standards being carried by the pipe 2 in place of the lamps 4. The links 20 that are used for swinging the light in a vertical plane are disposed above the chassis of the car and extend into the space enclosed by the hood. In this manner, all of the moving parts are not only kept free of dust, but are also hidden from view by the hood. The vibration of the headlight is dissipated by the spring 42, while the spring 43 takes up the shock from the vibration of the tube 28. The means for turning the headlights in a horizontal plane, i. e., the link 14, extends along the side of the fender and thence beneath the chassis. The headlights in reality closely resemble the standard headlights of an automobile, but they have the added advantage of being swingable in a horizontal and vertical plane.

When a person is driving along the street at night, it is often desirous to throw the beam of light in the direction in which the car is turning. This is impossible where the lights are fixed to the car. With the present device, however, the lights are automatically swung when the steering wheel is turned, whereby the light is always thrown in the desired direction. The device furthermore has an advantage over a light that is adapted to turn in a horizontal plane in that it may be swung in a vertical plane. The lights 4 may therefore be readily used as spotlights, if desired. The standards 1 provide a novel means for combining the mechanism necessary to swing the lights in a vertical plane and also the mechanism necessary to swing the light in a horizontal plane. It will be noted from Figures 4 and 5 that the sleeve 8 has a relatively large opening 47 therein which permits the lever 18 to move up and down with respect to the sleeve, and also permits the sleeve to be rotated with respect to the lever. The sleeve 28 has a slot 48 therein, which permits the sleeve to be rotated with respect to the bell crank lever 18. It is obvious that the slot 48 does not have to be enlarged so as to permit the vertical movement of the lever 18 with respect to the sleeve 28, since the sleeve is moved upwardly when the lever 18 is actuated.

In Figures 1 and 3 I have shown a horn 49 that is mounted upon an arm that in turn is pivotally connected to the pipe 2 at 52. A link 51 operatively connects the free end of the arm with the link 16. The horn 49 is swung when the steering wheel 15 is swung, so as to permit the driver to throw the sound from the horn in the direction in which the car is turning.

I claim:

1. In a device of the type described, a light carrying standard, a tube rotatably carried by said standard, a headlight support pivotally carried by said tube, a light secured to said support, a second tube slidably mounted in said first named tube, resilient means connecting said second named tube with said support, means for moving said second named tube, and resilient means for supporting said second named tube.

2. In a device of the type described comprising a standard, a tube rotatably carried by said standard, a light tilting member pivotally secured to said tube, a second tube disposed within said first named tube, means connecting said second named tube to said tilting member, means for taking up wear between said tube and said tilting member, a bell crank lever operatively connected to said second named tube, and means for taking up wear between said bell crank lever and said tube.

JAMES M. CALKINS.